(12) United States Patent
Boivie et al.

(10) Patent No.: US 10,298,545 B2
(45) Date of Patent: May 21, 2019

(54) SECURE PROCESSING ENVIRONMENT FOR PROTECTING SENSITIVE INFORMATION

(71) Applicant: International Business Machines Corporation, Armonk, NY (US)

(72) Inventors: Richard H. Boivie, Monroe, CT (US); Alyson Comer, Endicott, NY (US); John C. Dayka, New Paltz, NY (US); Donna N. Dillenberger, Yorktown Heights, NY (US); Kenneth A. Goldman, Norwalk, CT (US); Mohit Kapur, Sleepy Hollow, NY (US); Dimitrios Pendarakis, Westport, CT (US); James A. Ruddy, San Jose, CA (US); Peter G. Sutton, Poughkeepsie, NY (US); Enriquillo Valdez, Howard Beach, NY (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 14/024,665

(22) Filed: Sep. 12, 2013

(65) Prior Publication Data
US 2015/0074392 A1 Mar. 12, 2015

(51) Int. Cl.
*H04L 29/06* (2006.01)
*G06F 21/60* (2013.01)
*G06F 21/62* (2013.01)

(52) U.S. Cl.
CPC ........ *H04L 63/0428* (2013.01); *G06F 21/602* (2013.01); *G06F 21/6227* (2013.01); *G06F 21/6245* (2013.01); *H04L 63/0414* (2013.01); *H04L 63/0485* (2013.01)

(58) Field of Classification Search
CPC ................................................. H04L 63/0428
See application file for complete search history.

(56) References Cited

U.S. PATENT DOCUMENTS

| | | |
|---|---|---|
| 5,781,632 A | 7/1998 | Odom |
| 6,377,688 B1 | 4/2002 | Numao |
| 6,385,737 B1 | 5/2002 | Benignus et al. |
| 7,386,516 B2 | 6/2008 | Turgeon |
| 7,707,117 B1 * | 4/2010 | Jimenez ................. G06Q 20/38 705/64 |
| 7,864,952 B2 | 1/2011 | Pauker et al. |

(Continued)

OTHER PUBLICATIONS

Office Action dated Apr. 4, 2016, received in U.S. Appl. No. 14/854,921.

(Continued)

*Primary Examiner* — Simon P Kanaan
(74) *Attorney, Agent, or Firm* — Scully, Scott, Murphy & Presser, P.C.; William Kinnaman, Esq.

(57) ABSTRACT

A processor-implemented method for a secure processing environment for protecting sensitive information is provided. The processor-implemented method may include receiving encrypted data and routing the encrypted data to the secure processing environment. Then the encrypted data may be decrypted and fields containing sensitive information may be found. The method may also include obfuscating the sensitive information and returning, by the secure processing environment, the decrypted data and obfuscated data.

13 Claims, 5 Drawing Sheets

(56) References Cited

U.S. PATENT DOCUMENTS

| | | | |
|---|---|---|---|
| 8,208,627 B2 | 6/2012 | Pauker et al. | |
| 8,301,771 B2* | 10/2012 | Singh | H04L 63/0227 370/349 |
| 9,003,542 B1 | 4/2015 | MacKay et al. | |
| 2001/0007975 A1* | 7/2001 | Nyberg, Jr. | G06F 21/6245 705/55 |
| 2002/0123972 A1 | 9/2002 | Hodgson et al. | |
| 2003/0210819 A1* | 11/2003 | Spinat | G06F 17/30873 382/201 |
| 2005/0038788 A1* | 2/2005 | Dettinger | G06F 21/6227 |
| 2005/0209975 A1 | 9/2005 | So et al. | |
| 2006/0288151 A1 | 12/2006 | McKenney | |
| 2007/0094394 A1* | 4/2007 | Singh | H04L 63/0227 709/226 |
| 2007/0150965 A1 | 6/2007 | Redlich et al. | |
| 2007/0294539 A1* | 12/2007 | Shulman | G06F 17/30436 713/186 |
| 2008/0082837 A1 | 4/2008 | Mattsson | |
| 2009/0158441 A1* | 6/2009 | Mohler | G06F 21/552 726/27 |
| 2009/0178061 A1 | 7/2009 | Sandoval et al. | |
| 2010/0107220 A1 | 4/2010 | Nguyen | |
| 2010/0161494 A1 | 6/2010 | Slater | |
| 2010/0310076 A1 | 12/2010 | Barzilai et al. | |
| 2011/0137802 A1 | 6/2011 | Spies et al. | |
| 2012/0210083 A1 | 8/2012 | Lawrence | |
| 2012/0254320 A1* | 10/2012 | Dove | G06F 19/3418 709/206 |
| 2012/0259877 A1 | 10/2012 | Raghunathan et al. | |
| 2013/0006993 A1 | 1/2013 | Kobayashi | |
| 2014/0101734 A1 | 4/2014 | Ronda et al. | |
| 2014/0198724 A1* | 7/2014 | Abraham | H04L 67/16 370/328 |
| 2014/0281511 A1* | 9/2014 | Kaushik | G06F 21/6245 713/164 |
| 2015/0278534 A1* | 10/2015 | Thiyagarajan | G06F 21/62 726/28 |
| 2016/0171239 A1* | 6/2016 | Li | G06F 21/6245 713/189 |

OTHER PUBLICATIONS

U.S. Office Action dated Mar. 24, 2017 issued in U.S. Appl. No. 14/854,921.

Office Action dated Feb. 7, 2018, received in U.S. Appl. No. 14/854,921.

* cited by examiner

SECURE PROCESSING ENVIRONMENT FOR PROTECTING SENSITIVE INFORMATION

FIELD OF THE INVENTION

The present invention relates generally to the field of security, and more particularly to the secure transmission, processing and storage of sensitive information.

BACKGROUND

Currently, in a client-server computing environment the transmission of sensitive data may be protected in transit using a variety of means, such as establishing a Transport Layer Security (TLS) protected session between the client and server. TLS is a cryptographic protocol that provides communication security over the Internet. TLS uses asymmetric cryptography for authentication of key exchange, symmetric encryption for confidentiality, and message authentication codes for message integrity. Several versions of the protocol are in widespread use in applications such as web browsing, electronic mail, Internet faxing, instant messaging, and voice-over-IP (VoIP).

On the server sensitive information which had been encrypted during transmission is decrypted and available to the server application as cleartext (i.e., "in the clear"). Similarly, sensitive information that is sent from the server to the client is in the clear on the server before it is encrypted for transmission. As such, this cleartext sensitive information may be subject to disclosure on the server in memory dumps, through the use of debug tools that can be used to look into an application's memory, or by other means such as compromised or errant application logic.

Therefore, a high level security risk exists since there is a potential for the exposure of sensitive information such as credit card numbers. The sensitive information is visible to the operating system, the web server and the web application as well as to communications and data base software, device drivers and malware that infects any of this software. Additionally, in the event of a crash, this information is available in the clear in a core dump. As such, it is advantageous to provide a more secure processing environment for protecting sensitive data.

SUMMARY

A processor-implemented method for a secure processing environment for protecting sensitive information is provided. The processor-implemented method may include receiving encrypted data and routing the encrypted data to the secure processing environment. Then in the secure environment the encrypted data may be decrypted and a field that corresponds to sensitive information may be found. The method may also include obfuscating the sensitive information and returning, by the secure processing environment, the decrypted data and obfuscated data.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
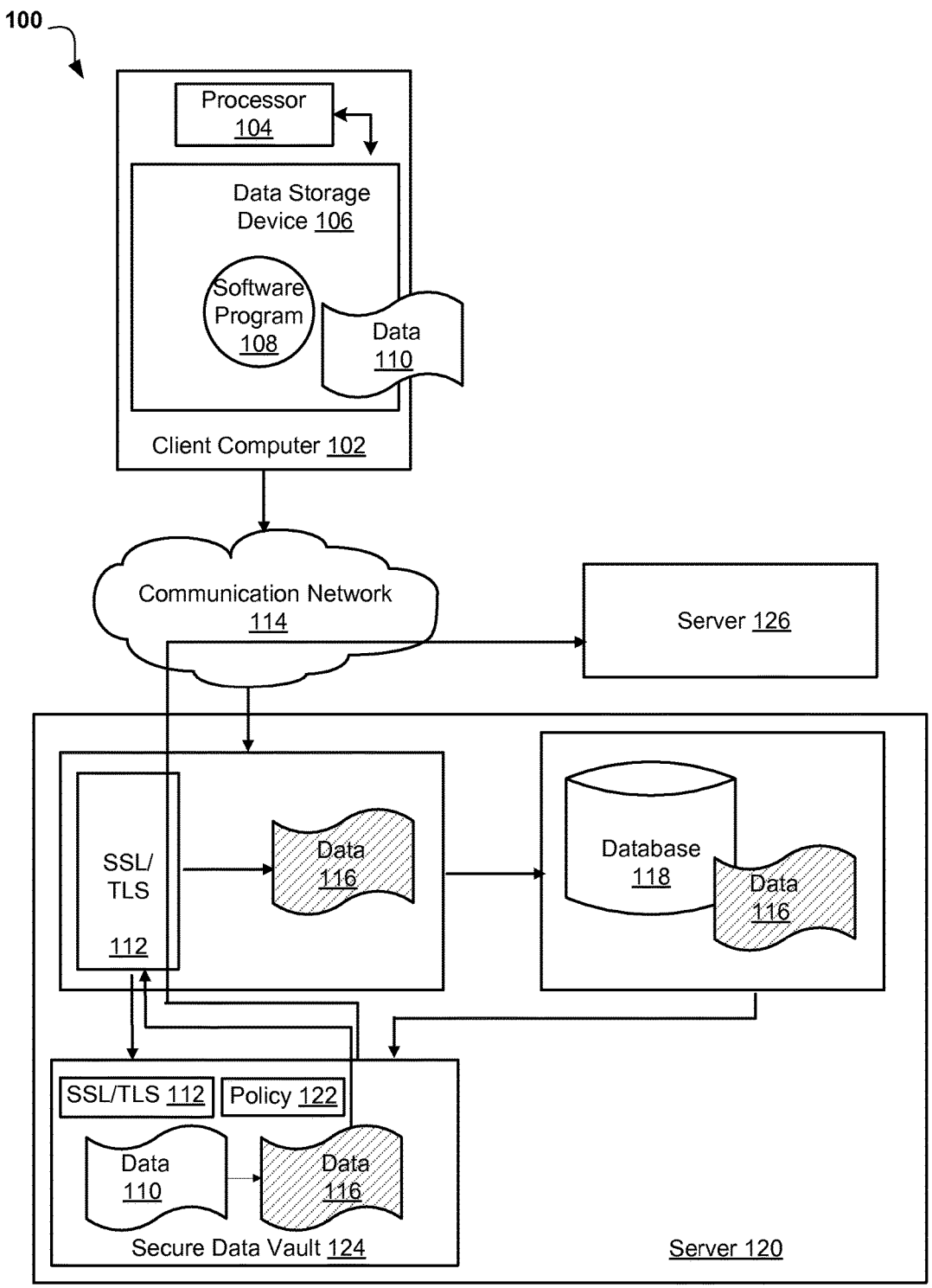
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention relates generally to data security within a computer, and more particularly, to the secure transmission, processing and storage of sensitive information. The following described exemplary embodiments provide a system, method and program to provide a more secure processing environment for protecting sensitive information.

According to at least one embodiment of the present invention, the exposure of sensitive information such as credit card numbers is minimized. Minimizing the exposure of such sensitive information is beneficial to protect this information from inappropriate use and also to minimize the complexity and costs of a security audit, such as a payment card industry compliance audit. To protect sensitive information from other software and from personnel that have access to the system or to a core dump, the secure environment ensures that sensitive information never appears in host memory in the clear (i.e., in unencrypted form or cleartext).

In an "ordinary" e-commerce application, credit card numbers are available in the clear to a large amount of software on a server. As previously described, this information is visible to the operating system, the web server and the web application as well as to communications and data base software, device drivers and malware that infects any of this software. Furthermore, in the event of a crash, this information may be available in the clear in a core dump. As such, there may be security risks involved in allowing clear text to be available on a server even for a short time. Therefore, there exists a need for providing a more secure processing environment for protecting sensitive data that is received across a network in a client-server computing environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage mediums would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer programs according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments provide a system, method and program to provide a more secure processing environment for protecting sensitive data in a client-server computing environment. The method may receive information via a network in encrypted form. This information may then be sent to a secure processing environment (i.e. a secure vault) for additional processing. In addition to decrypting the information that has been received over the network, the secure processing environment may also obfuscate or re-encrypt particularly sensitive information in a way that is usable by the receiving application while protecting that information from other software. The secure processing environment may include software, hardware, firmware or any combination thereof for maintaining the confidentiality and integrity of this particularly sensitive data. The obfuscation/encryption of the sensitive information prior to its entry in host memory reduces the risk of the sensitive information being hijacked while in the server. The present embodiment is different from the current state of the art in which sensitive information, such as credit card numbers, is available in the clear to a large amount of software on a server. Since in a typical e-commerce application sensitive data is exposed to such a large amount of software, there may be security risks involved in allowing cleartext to be available on a server even for a short time. As previously described, this cleartext sensitive information may be subject to disclosure on the server in memory dumps, through the use of debug tools that can be used to look into an application's memory, or by other means such as compromised or errant application logic. Therefore, the present embodiment allows for improving security in the transmission, processing and storage of sensitive information in a client-server computing environment by first encrypting the sensitive information prior to the sensitive information's transmission over a network and then, inside a secure environment on the server decrypting the received information and then obfuscating/re-encrypting particularly sensitive fields in a way that is usable by the receiving application while protecting that information from other software. As such, the sensitive information is in a secure, encrypted state prior to and throughout the entire process of transmission, processing and storage in a client-server computing environment.

Referring now to FIG. 1, an exemplary networked computer environment 100 in accordance with one embodiment is depicted. The networked computer environment 100 may include a client computer 102 with a processor 104 and a data storage device 106 that is enabled to run a software program 108 and may store unencrypted sensitive data 110. The networked computer environment 100 may also include a communication network 114, a server 126, and a server 120 with a database 118 that stores data 116 in protected form with the sensitive information obfuscated, tokenized or encrypted. (No particular distinction is drawn herein between these three terms; the term "obfuscate" is used generically herein for all of these.) The networked computer environment 100 may include a plurality of client computers 102 only one of which is shown. The communication network 114 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computers, or servers, 120 and 126 via the communication network 114. The communication network 114 may include connections, such as wire, wireless communication links, or fiber optic cables. As will be discussed with reference to FIG. 5, server computers 120 and 126 may include internal components 800a,b and external components 900a,b respectively, and client computer 102 may include internal components 800c and external components 900c, respectively. Client computer 102 may be, for example, a mobile device, a telephone, a personal digital assistant, a netbook, a laptop computer, a tablet computer, a desktop computer, or any type of computing device capable of running a program and accessing a network.

A software program 108 running on client computer 102 may execute a command to transfer unencrypted data 110 which may be stored on client computer 102 via communication network 114 to server 120. The data may be transmitted to server 120 via a cryptographic protocol that provides communication security over the internet, such as SSL/TLS, so that the data 110 is encrypted prior to transmission to server 120. Once the encrypted data arrives securely at the server 120, it is decrypted via SSL/TLS 112 on the server. According to one embodiment of the present invention, the encrypted data may be converted into unencrypted data by means of an instance of SSL/112 residing within a secure data vault 124 using a policy 122 to protect particularly sensitive information received on a server 120 before returning the data to software running on the server. The secure data vault 124 is explained in more detail below with respect to FIG. 2.

Figure 2:
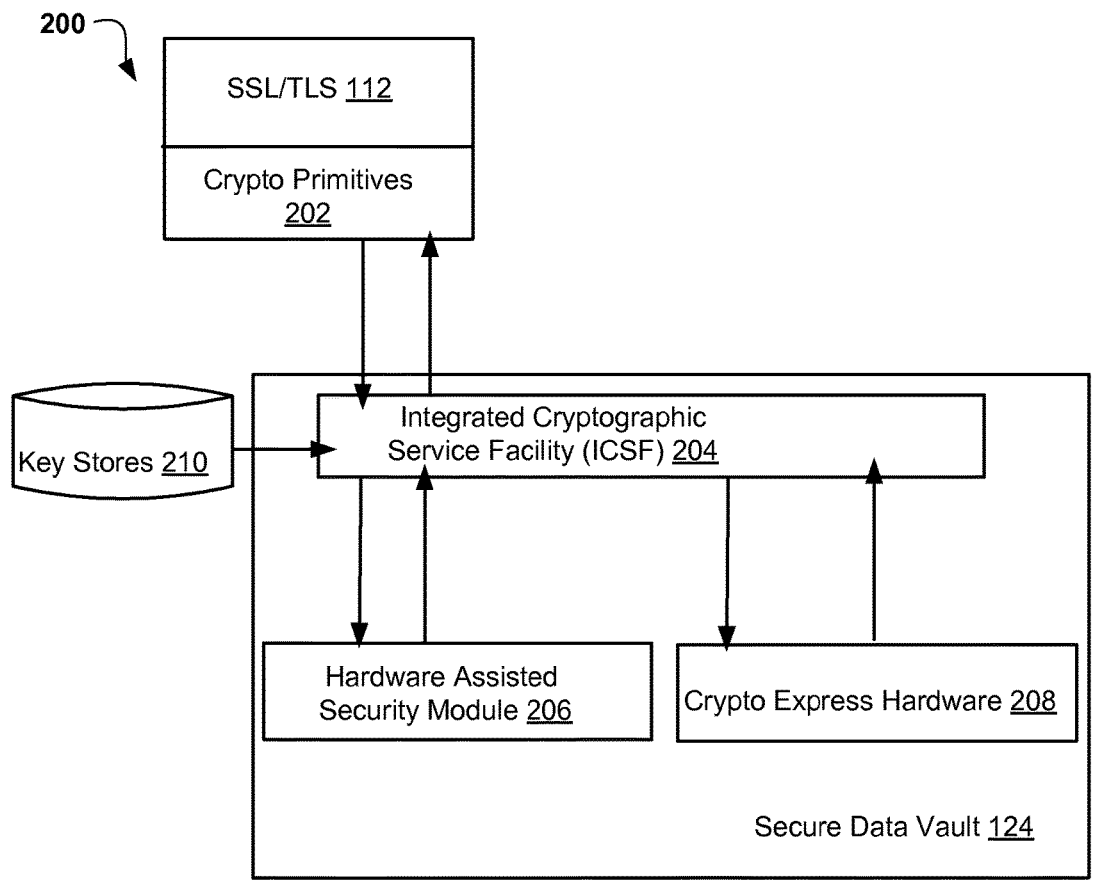
FIG. 2 illustrates a networked computer environment with two exemplary secure processing environments for protecting sensitive information according to one embodiment.

FIG. 2 illustrates a networked computer environment with two exemplary secure processing environments for protecting sensitive information according to one embodiment. The method may be implemented in an IBM Crypto Express card 208, in a Hardware Assisted Security Module 206, or in another form of secure data vault 124 (FIG. 1), with only one of these components being needed for a given server such as server 120 (FIG. 1).

The Secure Processing Environment/Secure Data Vault 124 may make use of a digital device such as a field-programmable gate array (FPGA). An FPGA is an integrated circuit designed to be configured by a customer or a designer after manufacturing, and is field-programmable. The FPGA configuration is generally specified using a hardware description language (HDL), similar to that used for designing an application-specific integrated circuit (ASIC). Contemporary FPGAs have large amounts of logic gates and RAM blocks to implement complex digital computations.

With respect to the present invention, the role of the Secure Processing Environment is to obfuscate (i.e. encrypt) sensitive data such as credit card numbers that are received at the host via a secure connection and to perform this obfuscation (or re-encryption) within a secure environment (i.e., secure data vault 124) so that only the obfuscated (or re-encrypted) form of the sensitive information is available on the host. The sensitive information never appears in host memory in the clear. Another important goal of the Secure Processing Environment is application transparency. The obfuscation may be done in a way that is transparent to application software. A final important goal of the Secure Processing Environment is performance. The obfuscation may use hardware and parallel processing to find and obfuscate sensitive information with minimal impact on system performance.

Although the present embodiment may be implemented on different platforms, IBM System z will be used as one example. As such, in one embodiment on IBM System z, the design of the Secure Environment uses two System z components, Application Transparent-Transport Layer Security (AT-TLS) and the IBM Crypto Express Secure Co-processor (CEX). The Crypto Express Secure Co-processor includes an IBM PowerPC CPU inside a tamper-sensing and tamper-responding protective enclosure in which processing can be done securely. The CEX also includes a crypto ASIC that can be used to decrypt TLS protected packets and obfuscate (or re-encrypt) certain specific sensitive fields within those packets that can perform these tasks with high performance. The CEX also includes an FPGA that can be used to search for HTML (or XML or other) tags that identify sensitive information and to search for many of these tags in parallel. While the CPU can compare a stream of bytes one byte at a time against a single tag, the FPGA logic can compare the stream to all bytes of all tags in parallel.

This embodiment on System z also uses z/OS and AT-TLS, provided by the z/OS TCP/IP stack. AT-TLS provides Transport Layer Security (e.g. HTTPS support) for an application in a way that is transparent to the application. This embodiment involves some changes to the AT-TLS code so that sensitive information doesn't appear in host memory in the clear. This involves a re-factoring or partitioning of the AT-TLS code so that some portions of the code run on the host and others run in the secure environment on the CEX. The TLS code is partitioned so that no sensitive information or secrets related to the TLS session appear in the clear on the host, although the host handles the transmission and reception of TLS packets. Additionally, the host handles session state so that very large numbers of concurrent connections and executing threads can be supported.

With respect to FIG. 2, when a TLS protected packet arrives at the host, the host portion of the TLS code passes the encrypted packet to the Crypto Express co-processor card 208. Note that the Integrated Cryptographic Service Facility 204 in z/OS on System z might be used to pass information to the Crypto Express Card 208. When the encrypted packet arrives at the Crypto Express card 208, the portion of the TLS code on the Crypto Express (corresponding to the instance 112 inside the vault 124 shown in FIG. 1) may use the crypto ASIC on the card to decrypt the packet and then the FPGA and the crypto ASIC to find and obfuscate any sensitive fields before returning the decrypted packet 116 (FIG. 1) to the TLS code 112 (FIG. 1) on the host outside of the secure data vault 124. When the decrypted TLS packet 116 (FIG. 1) arrives in host memory, the sensitive fields are obfuscated just as they would be if they had arrived from a point-of-sale terminal that obfuscates credit card numbers prior to transmitting them to the host.

In at least one embodiment of the present invention, the TLS protected encrypted communication channel logically terminates within a secure processing environment (e.g., secure data vault 124 (FIG. 1) or the Crypto Express Hardware 208 (FIG. 2). Within the bounds of this secure environment 124 (FIG. 1), information received may be securely decrypted, inspected and processed. Based on policy information 122 (FIG. 1) that is used to identify and specify appropriate handling of sensitive information, the secure environment 124 (FIG. 1) may apply a variety of techniques to tokenize, re-encrypt or obfuscate sensitive information before the sensitive information leaves the secure environment 124 (FIG. 1). This sensitive information protection policy 122 (FIG. 1) may specify techniques such as format preserving encryption, or tokenizing so that the host application need not be aware that the sensitive information is not in its true form. Thus, if information is disclosed such as in a memory dump or by other means, the sensitive information remains protected. In similar fashion, the secure environment 124 (FIG. 1) may use policy information 122 (FIG. 1) to identify and de-obfuscate sensitive information prior to encryption and transmission to another system.

Once the sensitive information has been protected (i.e., data 116 (FIG. 1)), it may be stored in this protected state in databases, file systems, in optical, magnetic or other media. If these repositories are accessed without using the secure environment (i.e., secure data vault 124 (FIG. 1)) and the information protection policy 122 (FIG. 1), the sensitive information (i.e., data 116 (FIG. 1)) remains protected in its tokenized, re-encrypted or obfuscated form (i.e., data 116 (FIG. 1)).

The client-server computing environment may take multiple forms, e.g. the client may be a web browser or other application hosted on a personal computer, or a mobile device such as a tablet or smart phone, or on another kind of computing system. Similarly, the application program may be acting as a client or a server application, or in peer to peer exchanges of sensitive information.

The information security policy 122 (FIG. 1) may also contain metadata which identifies and describes the structure of sensitive information and associates the actions to be performed on the data in order to tokenize or obfuscate fields, or records within the sensitive information. This information security policy 122 (FIG. 1) may be used by the secure processing environment (i.e., secure data vault 124) to inspect the sensitive information either entering or exiting the computing system. The secure processing environment 124 (FIG. 1) then acts on the sensitive information to tokenize or de-tokenize; obfuscate or de-obfuscate the sensitive information as required by the policy. This information security policy 122 (FIG. 1) and any needed key material to implement that policy may be provisioned into the secure processing environment 124 (FIG. 1) when the computer system is initialized or dynamically based on the application programs which execute on the computer system. The information security policy 122 (FIG. 1) may be encrypted and/or signed so that the secure processing environment 124 (FIG. 1) can validate the authenticity of the information security policy 122 (FIG. 1).

Figure 3:
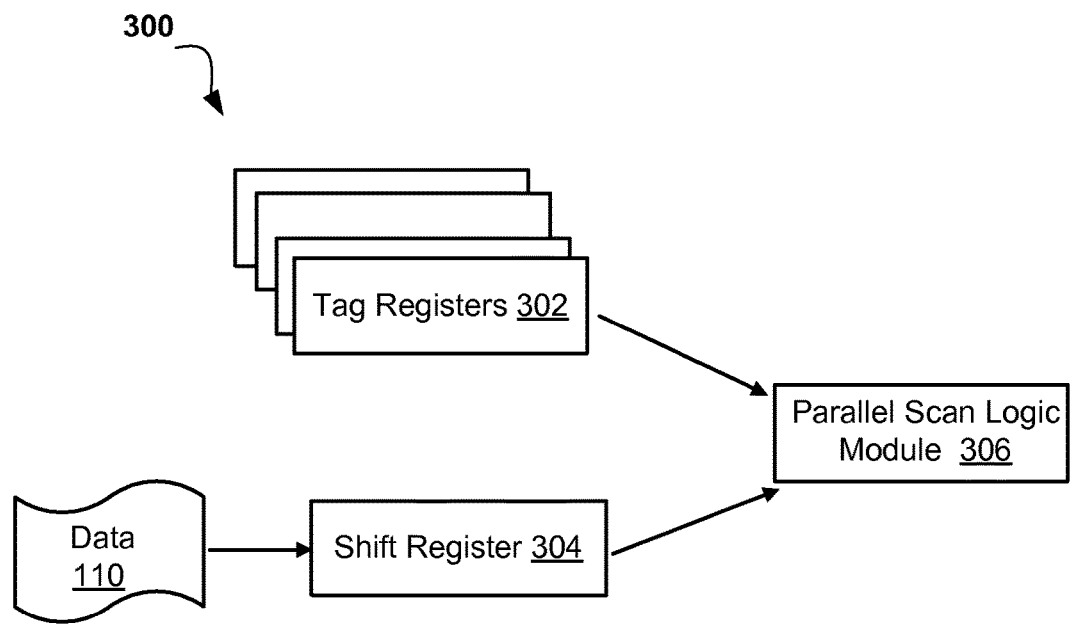
FIG. 3 illustrates the use of parallel scan logic for protecting sensitive information according to one embodiment.

In FIG. 3, the use of parallel scan logic 306 is illustrated. The TLS code on the Crypto Express card 208 (FIG. 2) or in another Hardware-assisted Security Module 206 may use parallel scan logic 306 (FIG. 3) programmed in an FPGA to find sensitive fields in a decrypted TLS packet (i.e., data 110). In one embodiment, this code shifts bytes from the decrypted packet 110 (FIG. 1) into a shift register 304 and the scan logic 306 compares the bytes at the head of this shift register 304 to multiple tag registers 302 simultaneously. After each byte is shifted into the shift register 304, the code may read a status register to determine if the bytes in the shift register 304 match one of the tag registers 302 and, if so, which tag matches. Alternatively, the parallel scan logic 306 may generate an interrupt when it finds a match so the code would not have to "poll" (i.e. read the status register after each byte is shifted into the shift register 304). The tags that correspond to sensitive fields must be loaded into the tag registers 302 before the decrypted packet data 110 (FIG. 1) is clocked into the shift register 304.

In addition to identifying and obfuscating sensitive information when information is received, the secure environment may use policy information 122 (FIG. 1) to identify and de-obfuscate sensitive information prior to encryption and transmission to another system. For example, once a transaction has been processed by a web merchant, obfuscated credit card information may be de-obfuscated prior to SSL/TLS encryption and transmission to a credit card company for processing.

Figure 4:
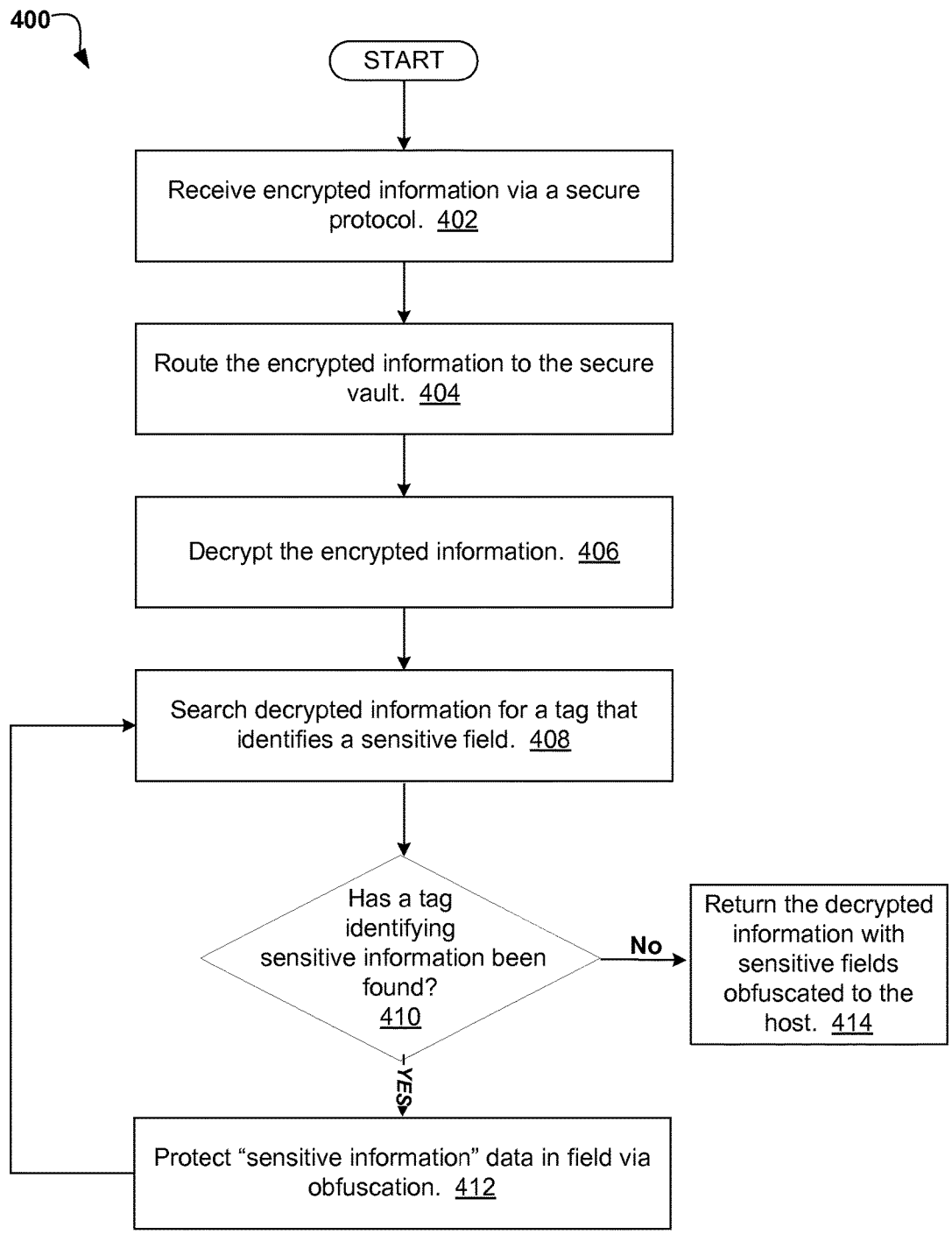
FIG. 4 is an operational flowchart illustrating the steps carried out by a secure processing environment for protecting sensitive information according to one embodiment.

Referring now to FIG. 4, an operational flowchart illustrating the steps carried out by a secure processing environment program for protecting sensitive information in accordance with an embodiment of the present invention is depicted. The program may be implemented in a secure data vault 124 (FIG. 1) according to one embodiment.

At 402, encrypted information is received via a secure protocol. Then at 404, the encrypted information is routed to the secure data vault 124 (FIG. 1). At 406, the method may decrypt the information within the secure data vault.

Next at 408, the method searches for the next tag in the received information that corresponds to a sensitive field. In one embodiment, this might be done via the parallel scan logic discussed in connection with FIG. 3.

It is determined at 410 whether a tag that identifies a sensitive field has been found. If a tag that identifies a sensitive field was not found, the decrypted information is returned to the host at 414. However, if a tag that identifies a sensitive field is found, the corresponding sensitive field is obfuscated at 412 and the method returns to 408 to search for the next tag in the received information that corresponds to a sensitive field. When all the sensitive fields have been found and obfuscated, at 414 the decrypted information with sensitive fields obfuscated is returned to the host.

Figure 5:
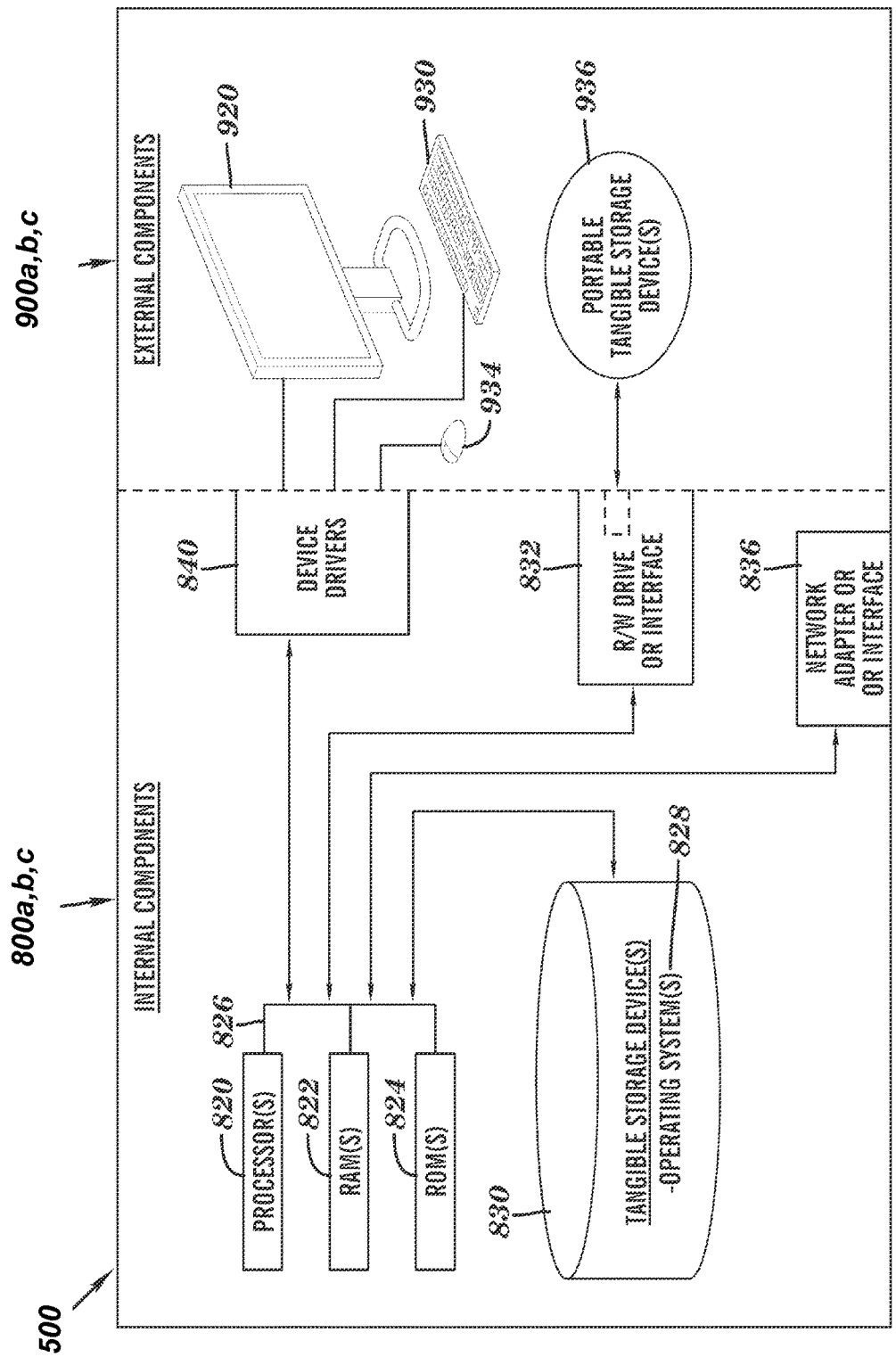
FIG. 5 is a block diagram of internal and external components of computers and servers depicted in FIG. 1.

FIG. 5 is a block diagram of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network servers 120, 126 (FIG. 1) include respective sets of internal components 800a, b, c and external components 900a, b, c illustrated in FIG. 5. Each of the sets of internal components 800a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software program 108 (FIG. 1) in client computer 102 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program 108 can be stored on one or more of the respective portable computer-readable tangible storage devices 936, read via the respective R/W drive or interface 832 and loaded into the respective hard drive 830.

Each set of internal components 800a, b, c also includes network adapters or interfaces 836 such as a TCP/IP adapter cards, wireless wi-fi interface cards, or 3G or 4G wireless interface cards or other wired or wireless communication links. A software program 108 in client computer 102 can be downloaded to client computer 102 from an external computer via a network (for example, the Internet, a local area network or other, wide area network) and respective network adapters or interfaces 836. From the network adapters or interfaces 836, the software program 108 in client computer 102 is loaded into the respective hard drive 830. The network may comprise copper wires, optical fibers, wireless transmission, routers, firewalls, switches, gateway computers and/or edge servers.

Each of the sets of external components 900a, b, c can include a computer display monitor 920, a keyboard 930, and a computer mouse 934. External components 900a, b, c can also include touch screens, virtual keyboards, touch pads, pointing devices, and other human interface devices. Each of the sets of internal components 800a, b, c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A computer system for protecting sensitive information for a receiving application on a host server computer, the host server computer including a host memory, the computer system comprising:
   one or more processors, one or more computer-readable memories, one or more computer-readable tangible storage devices, and program instructions stored on at least one of the one or more tangible storage devices for execution by at least one of the one or more processors via at least one of the one or more memories, the program instructions comprising:
   program instructions to receive at the host server computer encrypted data and to route the encrypted data to a secure processing environment prior to the encrypted data entering the host memory, the encrypted data including specified sensitive information, the specified sensitive information including one or more fields of sensitive data, and each of said fields being identified by a tag;
   program instructions to decrypt the encrypted data in the secure processing environment;
   program instructions to identify in the secure processing environment the one or more fields within the decrypted data containing the specified sensitive information for the receiving application on the host server computer, including program instructions to search the decrypted information for the one or more tags identifying the one or more fields of sensitive data;
   program instructions to obfuscate in the secure processing environment the identified decrypted sensitive information prior to entry of the identified decrypted sensitive information into the host memory, and in a way that is usable by the receiving application on the host server computer while protecting the identified decrypted sensitive information from other software on the host server computer, including program instructions for, each time one of the tags is identified, obfuscating the field of sensitive data identified by the each tag; and
   program instructions to return the decrypted data from the secure processing environment with the identified decrypted sensitive information obfuscated to make the obfuscated sensitive information accessible to the receiving application on the host server computer, and wherein the sensitive information never appears in the host memory as the decrypted sensitive information.

2. The computer system of claim 1, wherein the secure processing environment includes a policy for identifying the sensitive information.

3. The computer system of claim 2, wherein the policy includes a specification of de-obfuscation of obfuscated information.

4. The computer system of claim 2, wherein the policy may be provisioned into the secure processing environment when the computer system is initialized or dynamically based on an application program which executes on the computer system.

5. The computer system of claim 2, wherein the policy uses at least one of meta data and a field definition document to identify the sensitive information.

6. The computer system of claim 1, wherein the program instructions to identify a field within the decrypted data containing sensitive information comprise program instructions to identify the field by at least one of a tag and an offset into a received data stream.

7. The computer system of claim 6, wherein a parallel scan logic is used to identify the tag from the decrypted data that identifies sensitive information.

8. A computer program product for protecting sensitive information for a receiving application on a host server computer, the host server computer including a host memory, the computer program product comprising:
   one or more computer-readable tangible storage devices and program instructions stored on at least one of the one or more tangible storage devices, the program instructions comprising:
   program instructions to receive at the host server computer encrypted data and to route the encrypted data to a secure processing environment prior to the encrypted data entering the host memory, the encrypted data including specified sensitive information, the specified sensitive information including one or more fields of sensitive data, and each of said fields being identified by a tag;
   program instructions for the host server computer to route the encrypted data to a secure processing environment;
   program instructions to decrypt the encrypted data in the secure processing environment;
   program instructions to identify in the secure processing environment the one or more fields within the decrypted data containing the specified sensitive information for the receiving application on the host server computer, including program instructions to search the decrypted information for the one or more tags identifying the one or more fields of sensitive data;
   program instructions to obfuscate in the secure processing environment the identified decrypted sensitive information prior to entry of the identified decrypted sensitive information into the host memory, and in a way that is usable by the receiving application on the host server computer while protecting the sensitive information from other software on the host server computer, including program instructions for, each time one of the tags is identified, obfuscating the field of sensitive data identified by the each tag; and
   program instructions to return the decrypted data from the secure processing environment with the identified decrypted sensitive information obfuscated to make the obfuscated sensitive information accessible to the receiving application of the host server computer, and wherein the sensitive information never appears in the host memory as the decrypted sensitive information.

9. The computer program product of claim 8, wherein the secure processing environment includes a policy for identifying the sensitive information.

10. The computer program product of claim 9, wherein the policy includes a specification of de-obfuscation of obfuscated information.

11. The computer program product of claim 8, wherein the program instructions to identify a field within the decrypted data containing sensitive information comprise program instructions to identify the field by at least one of a tag and an offset into a received data stream.

12. The computer system according to claim 2, wherein:
   the one or more processors include a plurality of tag registers to find the sensitive fields in the decrypted data; and
   the program instructions to identify a field within the decrypted data containing sensitive information includes program instructions to compare values from the decrypted data with the tag registers to determine if said values match one of the tag registers.

13. The computer system according to claim 1, wherein:
  the program instructions to identify a field within the decrypted data containing the specified sensitive information includes program instructions to identify the field in the decrypted data containing the specified sensitive information after the encrypted data is decrypted in the secure processing environment; and
  the program instructions to obfuscate the identified decrypted sensitive information include program instructions to obfuscate the identified decrypted sensitive information after the field within the decrypted data containing the specified sensitive information is identified.

\* \* \* \* \*